United States Patent
Mongoin et al.

(10) Patent No.: US 8,258,229 B2
(45) Date of Patent: Sep. 4, 2012

(54) USE OF (METH)ACRYLIC POLYMERS IN A METHOD FOR MANUFACTURE OF AN AQUEOUS SUSPENSION OF CALCIUM CARBONATE

(75) Inventors: Jacques Mongoin, Quincieux (FR); Christian Jacquemet, Lyons (FR); Jean-Marc Suau, Lucenay (FR)

(73) Assignee: Coatex S.A.S., Genay (FR)

( * ) Notice: Subject to any disclaimer, the term of this patent is extended or adjusted under 35 U.S.C. 154(b) by 0 days.

(21) Appl. No.: 13/000,094

(22) PCT Filed: Jun. 16, 2009

(86) PCT No.: PCT/IB2009/006003
§ 371 (c)(1),
(2), (4) Date: Dec. 20, 2010

(87) PCT Pub. No.: WO2010/004392
PCT Pub. Date: Jan. 14, 2010

(65) Prior Publication Data
US 2011/0092629 A1  Apr. 21, 2011

(30) Foreign Application Priority Data
Jul. 7, 2008 (FR) ..................................... 08 03855

(51) Int. Cl.
C08K 3/04 (2006.01)
C08K 3/26 (2006.01)
(52) U.S. Cl. ....................... 524/495; 524/425
(58) Field of Classification Search .................. 524/425, 524/556
See application file for complete search history.

(56) References Cited

U.S. PATENT DOCUMENTS

| | | | |
|---|---|---|---|
| 2004/0250970 A1* | 12/2004 | Qiu et al. | 162/135 |
| 2006/0111534 A1* | 5/2006 | Suau et al. | 526/317.1 |
| 2006/0148951 A1 | 7/2006 | Qiu et al. | |
| 2007/0106042 A1 | 5/2007 | Suau et al. | |
| 2007/0197747 A1 | 8/2007 | Suau et al. | |

FOREIGN PATENT DOCUMENTS

| | | |
|---|---|---|
| FR | 2 842 814 | 1/2004 |
| JP | 2000 239595 | 9/2000 |
| WO | 02 49766 | 6/2002 |

OTHER PUBLICATIONS

"Targeted Dispersants for Buik Calcium Carbonate Slurry", Applied Chemical Anwendungs Technik (ACAT), pp. 1-3 (Aug. 24, 2007).*
"Targeted Dispersants for Bulk Calcium Carbonate Slurry", Applied Chemical Anwendungs Technik, pp. 1-3 (Aug. 24, 2007) XP-002516974.
International Search Report Issued Aug. 31, 2009 in PCT/IB09/006003 filed Jun. 16, 2009.

* cited by examiner

*Primary Examiner* — Hui Chin
(74) *Attorney, Agent, or Firm* — Oblon, Spivak, McClelland, Maier & Neustadt, L.L.P.

(57) ABSTRACT

A method including first grinding, in aqueous media of natural calcium carbonate, an acrylic polymer having a molecular weight of between 8,000 g/mole and 15,000 g/mole and a molar content of less than 20% of polymeric chains of molecular weight less than 3,000 g/mole and second, optionally concentrating, leading to an aqueous suspension with an increased slope factor, which improves the opacity of the coated paper produced from such a suspension.

20 Claims, No Drawings

USE OF (METH)ACRYLIC POLYMERS IN A METHOD FOR MANUFACTURE OF AN AQUEOUS SUSPENSION OF CALCIUM CARBONATE

This application is a 371 of PCT/IB2009/006003, filed Jun. 16, 2009.

Ground natural calcium carbonate—or GCC—is a mineral pigment commonly used in coatings intended to cover paper sheets, and to give the latter certain optical properties such as opacity. This calcium carbonate is initially used in the form of an aqueous suspension, which is more simple to transport, handle and decant than a dry powder. The said suspension is then used in the composition of a paper coating, the latter being used to coat the paper sheet.

A method for manufacturing such a suspension consists in grinding in the water the said calcium carbonate in the presence of a grinding aid agent, until a certain granulometry is obtained, i.e. a certain distribution of particle sizes. During this step an agent known as a "grinding aid agent", the function of which is to facilitate the mechanical grinding action, is used. This is generally a homopolymer or a copolymer of acrylic acid, obtained by traditional polymerisation processes, in emulsion or in solution (see notably documents FR 2 539 137, FR 2 683 536, FR 2 683 537, FR 2 683 538, FR 2 683 539, FR 2 683 532 and FR 2 683 533).

Subsequently, the dry extract of this suspension (or quantity by dry weight of calcium carbonate relative to the total weight of the suspension) is increased by elimination of water: the purpose of this step, which has no effect on the granulometry of the calcium carbonate, is to deliver a final product which is as rich as possible in mineral matter.

It is important then to have an aqueous suspension of mineral matter which remains sufficiently fluid over time. This property can be apprehended very simply through measurements of Brookfield™ viscosity of the suspension, immediately after grinding, and subsequently 8 days later, provided the medium has not been stirred. By this means possible viscosimetric inconsistencies, which the skilled man in the art will seek to avoid, are revealed: this is a part of the technical problem resolved by the present invention.

The other constraint, incorporated by the present invention, is to obtain a suspension of calcium carbonate leading to as high as possible an opacity, since this property is sought for the coated paper sheet. And it has been known for a long time that opacity is linked to a certain distribution of individual particle sizes of calcium carbonate within the aqueous suspension. This distribution must be as "close" as possible; reference is also made to a "vertical" granulometric distribution, with regard to the shape of the graph obtained (percentage by weight of the particles having a given diameter as a function of the diameter).

The "verticality" or "closeness" of the distribution of the particle sizes is reflected by the "slope factor", f, a parameter well-known to the skilled man in the art. This slope factor is calculated as being equal to the ratio between the percentage by weight of particles the diameter of which is less than a diameter $d_1$ and the percentage by weight of the particles the diameter of which is less than another diameter $d_2$, i.e.:

$$f=(d_1/d_2)*100$$

The higher the slope factor, the "closer" the distribution of the particle sizes, and the better will be the opacity of the final coated paper. This idea is notably supported in the document "Pigment concepts for improved paper and print properties" (P. Burri, ATIP Conference, Jun. 23, 2000 Tour), especially on page 4.

Document WO 03/089524 can also be cited which, even though it refers to aqueous suspensions of kaolin, indicates a slope factor $100*(d_{30}/d_{70})$ at least equal to 39, which leads to a paper coated from a coating produced with the said kaolin, having improved optical properties.

Similarly, document EP 0 894 836 describes an aqueous suspension of GCC, one of the characteristics of which lies in a slope factor $(d_{50}/d_{20})$ of between 1.5 and 2, and preferentially between 1.5 and 1.75. Bearing in mind the particular definition given to the slope factor, this invention is indeed directed towards a narrow distribution of particle sizes: it is also indicated that the opacity of the final products is improved thereby.

Document EP 1 579 070 describes a blend of two carbonate pigments at least one of which is a GCC having a slope factor $100*(d_{30}/d_{70})$ between 30 and 45, preferentially between 35 and 45, and very preferentially between 37 and 45; the opacity of a coated paper containing these blends is then improved (see table 5).

Finally, document WO 2007/031870 describes the grinding of a precipitated calcium carbonate, or PCC with a GCC, in an aqueous medium, where the co-ground pigment is obtained with a slope factor $100*(d_{30}/d_{70})$ of over 30, preferentially 40, very preferentially 45; the opacity of the final paper is then increased (see table 2).

In parallel to this need initially to grind the calcium carbonate to obtain a high slope factor, the skilled man in the art seeks to maximise the final dry extract through the second step of elimination of water; and this latter step is particularly costly in terms of energy. Ideally, it would therefore be necessary to grind the calcium carbonate until as high as possible a dry extract is obtained, in order to minimise the water evaporation step, whilst retaining a high slope factor with a view to doping the opacity of the coated paper. Unfortunately these two requirements are in contradiction with one another.

Indeed, the more the calcium carbonate is ground to a high dry extract, the more the slope factor deteriorates. This is expressed very clearly in document WO 2004/026973 which indicates (page 2, lines 6-8) that obtaining a narrow distribution of the size of GCC particles is opposed to a high dry extract grinding, since the latter notably leads to an increase of the fraction of the finest particles, and thus to a broadening of the distribution of the particle sizes. The skilled man in the art who seeks at once to minimise the final concentration step (i.e. to grind initially to the highest concentration possible), whilst seeking to obtain improved opacity properties ultimately (by means of a high slope factor not deteriorated by a grinding to too high a concentration) is therefore now faced with an unsatisfactory compromise situation.

Continuing their research to offer the skilled man in the art a solution allowing:

a higher slope factor than with the grinding aid agents of the prior art, and therefore an improved opacity to be obtained, whilst initially grinding at the same concentration, and whilst eliminating water until the same final dry extract, a final aqueous suspension to be obtained which is stable over time, the Applicant has developed use in a method of manufacture of an aqueous suspension of natural calcium carbonate through a step of grinding and a step of concentration in an aqueous medium, of a homopolymer and/or of a copolymer of (meth)acrylic acid characterised:

in that it is implemented during the grinding step, in that it has a molecular weight of between 8,000 g/mole and 15,000 g/mole, and preferentially between 8,000 g/mole and 12,000 g/mole, and in that it has a molar polymeric chains content by molecular weight less than 3,000 g/mole less than 20%, preferentially 15%, very preferentially 10% as the activating opacity agent.

It is indicated that, throughout the present Application, the molecular weights, like the molar polymeric chain contents the molecular weight of which is less than a certain value are determined according to a particular method as described in the introduction to the examples.

Similarly, through the expression "activating opacity agent", an agent must be understood which, when it is used in the method described above, to manufacture an aqueous suspension of calcium carbonate, itself used to formulate a paper coating, where the latter is intended to be applied to a paper sheet, leads to a sheet the opacity of which is improved. In concrete terms, the skilled man in the art many years ago identified a parameter which, measured in terms of the suspension of calcium carbonate, changes in the same way as the opacity of the coated paper sheet: this is the light diffusion coefficient of the suspension (S expressed in $m^2/kg$), where the latter is applied on to a support. In the present Application, we shall rely notably on the measurement of this coefficient S in the aqueous suspension of calcium carbonate (the method for measuring the coefficient S is indicated in document FR 2 885 906).

Thus, and in a surprising manner, compared to a prior art relying on the use of a traditional grinding aid agent, i.e. a homopolymer and/or a copolymer of (meth)acrylic acid which does not meet the previous 2 conditions, the homopolymers and the copolymers of the (meth)acrylic acid according to the invention allow:

whilst grinding with the same dry extract as for the prior art, a higher slope factor $100*(d_{25}/d_{75})$ and thus a better opacity (S) to be obtained, whilst also manufacturing aqueous suspensions which are stable over time.

One of the merits of the Applicant is that it successfully identified that the choice of a range of specific molecular weights, in combination with a limited fraction of polymeric chains of low molecular weight, constituted the optimum combination to obtain an aqueous suspension which was at once stable and had a high slope factor, which is synonymous with an improved opacity. Moreover, it is easy for the skilled man in the art to manufacture polymers having this combination of characteristics, notably using techniques known as "separation" techniques, and controlled radical polymerisation methods such as, notably, the technique known as the "RAFT" (reversible addition-fragmentation transfer) technique.

The first are relatively old methods (start of the 80s), which seek to "purify" the polymer as obtained after its synthesis. They use steps enabling populations of polymeric molecular chains having a given molecular weight to be isolated (through a choice of appropriate solvents and temperatures) and lead, firstly, to a given molecular weight being obtained, and to the chosen content for the polymeric chains having, for example, a molecular weight less than a certain limit. The skilled man in the art can notably refer to document U.S. Pat. No. 4,507,422.

The second techniques are manufacturing techniques which, notably through the use of particular catalysts, allow the distribution of the molecular weights during the polymerisation reaction to be controlled. The choice of the synthesis conditions (such as, notably, the used catalyst/monomers ratio) enables the skilled man in the art to attain both a given molecular weight, and a polymeric chains content the molecular weight of which is less than a certain limit. The skilled man in the art may notably refer to documents: (1) WO 02/070571, which is the international publication PCT/FR02/00722, filed Feb. 28, 2002, claiming priority to French Appl. No. 01/02848, filed Mar. 2, 2001, corresponding to U.S. application. Ser. No. 10/468,398, published as US 2004/0097674 A1, and patented as U.S. Pat. No. 7,345,121 B2 on Mar. 18, 2008; (2) WO 2004/014967, which is the international publication PCT/FR03/002337, filed Jul. 24, 2003, claiming priority to French Appl. No. 02/09499, filed Jul. 26, 2002, corresponding to U.S. application. Ser. No. 10/522, 340, published as US 2006/0111534 A1, and patented as U.S. Pat. No. 7,462,676 B2 on Dec. 9, 2008; and (3) WO 2005/095466, which is the international publication PCT/FR05/00702, filed Mar. 23, 2005, claiming priority to French Appl. No. 04/03197, filed Mar. 29, 2004, corresponding to U.S. application. Ser. No. 10/594,520, published as US 2007/0179262 A1, on Aug. 2, 2007, (the content of each of which is incorporated by reference in the present application, and also to the publications "Dispersion of calcite by poly(sodium acrylate) prepared by reversible addition-fragmentation chain transfer (RAFT) polymerization" (Polymer (2005, 46(19), 2005, pp 8565-8572) and "Synthesis and Characterization of Poly(acrylic acid) Produced by RAFT Polymerization. Application as a Very Efficient Dispersant of CaCO3, Kaolin and TiO2" (Macromolecules, 36(9), 2003, pp 3066-3077).

Moreover, it is important to stress that none of the abovementioned documents with regard to the methods for separation and for controlled radical polymerisation relates in a particular manner to a method of manufacture of calcium carbonate, by grinding followed by concentration in an aqueous medium. It will be noted here that this is a very particular method, as presented in document WO 02/49765, where an acrylic polymer with very specific neutralisation rates in mono- and di-valent cations leads to an aqueous suspension with a low quantity of grinding aid agents not adsorbed on the surface of the calcium carbonate. Furthermore, none of the abovementioned documents concerning the separation and controlled radical polymerisation techniques gives any information concerning the capacity of a homopolymer or a copolymer of (meth)acrylic acid to be a satisfactory activator of opacity, if the said homopolymer meets both particular conditions forming the subject of the present invention.

Thus, a first object of the invention consists in the use, in a method to manufacture an aqueous suspension of natural calcium carbonate through:

a) a grinding step, b) and possibly a step of concentration in an aqueous medium, of a homopolymer and/or of a copolymer of (meth)acrylic acid characterised:

in that it is implemented during the grinding step, in that it has a molecular weight of between 8,000 g/mole and 15,000 g/mole, and preferentially between 8,000 g/mole and 12,000 g/mole, and in that it has a molar polymeric chains content by molecular weight less than 3,000 g/mole less than 20%, preferentially 15%, very preferentially 10% as the activating opacity agent.

In a first variant, this use is also characterised in that the said homopolymer and/or copolymer of (meth)acrylic acid is obtained by radical polymerisation in emulsion or in solution, followed by at least one static or dynamic step, where the said separation step uses one or more polar solvents preferentially belonging to the group constituted by water, methanol, ethanol, propanol, isopropanol, the butanols, acetone, tetrahydrofuran or their blends.

In a second variant, this use is also characterised in that the said homopolymer and/or copolymer of (meth)acrylic acid is obtained by controlled radical polymerisation, preferentially by polymerisation by reversible addition-fragmentation transfer (RAFT). It is important to stress that the skilled man in the art has, using his knowledge and the state of the technique, all the necessary elements to manufacture a polymer verifying the twin characteristic forming the subject of the present Application: in this sense, he is capable of synthesising the polymers forming the subject of the present invention. This is, notably, emphasised in the state of the technique relative to the manufacture of acrylic polymers, with a view to controlling both their molecular weight and their polymolecularity index (and thus naturally the rate of oligomers, or the proportion of polymeric chains the molecular weights of which are lower than a certain value). Reference may be made to the abovementioned documents (see top of previous page).

In this second variant, this use is also characterised in that the polymerisation by reversible addition-fragmentation transfer (RAFT) uses at least one chain transfer agent, as claimed in documents: (1) WO 02/070571, which is the international publication PCT/FR02/00722, filed Feb. 28, 2002, claiming priority to French Appl. No. 01/02848, filed Mar. 2, 2001, corresponding to U.S. application. Ser. No. 10/468, 398, published as US 2004/0097674 A1, and patented as U.S. Pat. No. 7,345,121 B2 on Mar. 18, 2008; (2) WO 2004/014967, which is the international publication PCT/FR03/002337, filed Jul. 24, 2003, claiming priority to French Appl. No. 02/09499, filed Jul. 26, 2002, corresponding to U.S. application. Ser. No. 10/522,340, published as US 2006/0111534 A1, and patented as U.S. Pat . No. 7,462,676 B2 on Dec. 9, 2008; and (3) WO 2005/095466, which is the international publication PCT/FR05/00702, filed Mar. 23, 2005, claiming priority to French Appl. No. 04/03197, filed Mar. 29, 2004, corresponding to U.S. application. Ser. No. 10/594, 520, published as US 2007/0179262 A1, on Aug. 2, 2007, (the content of each of which is incorporated by reference in the present application).

Generally, this use is also characterised in that the said homopolymer and/or copolymer of (meth)acrylic acid is totally acid, or totally or partially neutralised by a neutralisation agent chosen from among the sodium or potassium hydroxides, the calcium or magnesium hydroxides and/or oxides, ammonium hydroxide, or their blends, preferentially by a neutralisation agent chosen from among sodium or potassium hydroxide, ammonium hydroxide, or their blends, and very preferentially by a neutralisation agent which is sodium hydroxide.

Generally, this use is characterised in that, in addition to the (meth)acrylic acid, the said copolymer of (meth)acrylic acid contains another monomer chosen from among (meth)acrylic anhydride, (meth)acrylamide, the (meth)acrylic esters, and preferentially from among the methyl, ethyl, isopropyl, n-propyl, isobutyl, n-butyl, ter-butyl, or 2-ethylhexyl acrylates, the methyl or ethyl methacrylates, the hydroxylate methacrylates, styrene, alpha-methylstyrene, styrene sulfonate, or acrylamido-2-methyl-2-propane-sulphonic acid, the acrylate and methacrylate phosphates of ethylene glycol, and their blends, and in that this other monomer is preferentially acrylamide.

This use is also characterised in that the said homopolymer and/or copolymer of (meth)acrylic acid is used at a rate of 0.1 to 1.0%, and preferentially 0.2 to 0.6%, by dry weight, relative to the dry weight of calcium carbonate.

This use is also characterised in that, in addition to the said homopolymer and/or copolymer of (meth)acrylic acid, another homopolymer and/or copolymer of (meth)acrylic acid is used jointly during the concentration step b).

This use is also characterised in that the concentration by dry weight of calcium carbonate of the aqueous suspension obtained on conclusion of grinding step a) is between 35% and 60% of the total weight of the said suspension.

This use is also characterised in that that the concentration by dry weight of calcium carbonate of the aqueous suspension obtained on conclusion of grinding step b) is between 61% and 78%, preferentially between 70% and 75%, of the total weight of the said suspension.

EXAMPLES

Preamble

Throughout the present Application, the granulometric characteristics relative to the calcium carbonate are determined using a Sedigraph™ 5100 device, sold by the company MICROMERITICS™.

The light diffusion factor S is determined according to the method given in document FR 2 885 906.

The molecular weights and the molar contents of polymeric chains the molecular weight of which is less than a given value are determined using the following method.

A test portion of the polymer solution corresponding to 90 mg of dry matter is introduced into a 10 mL flask. Mobile phase, with an additional 0.04% of DMF, is added, until a total mass of 10 g is reached. The composition of this mobile phase is as follows: NaHCO3: 0.05 mole/l, NaNO3: 0.1 mole/l, triethanolamine: 0.02 mole/l, NaN3 0.03% by mass.

The CES chain consists of an isocratic pump of the Waters™ 510 type, the flow rate of which is set at 0.8 mL/min., a Waters 717+ sample changer, a kiln containing a precolumn of the "Guard Column Ultrahydrogel Waters™" type, followed by a linear column of the "Ultrahydrogel Waters™" type, which is 30 cm in length and has an internal diameter of 7.8 mm.

Detection is accomplished by means of a Waters™ 410 type differential refractometer. The kiln is heated to a temperature of 60° C., and the refractometer is heated to a temperature of 45° C.

The CES is calibrated with a series of sodium polyacrylate standards supplied by Polymer Standard Service having maximum molecular weight of between 2,000 and $1.10^6$ g/mole and of polymolecularity index of between 1.4 and 1.7, and also with a sodium polyacrylate of molecular weight equal to 5,600 g/mole and polymolecularity index equal to 2.4.

The calibration graph is of the linear type and takes account of the correction obtained using the flow rate marker (DMF).

Acquisition and processing of the chromatogram are accomplished through use of the PSS WinGPC Scientific v 4.02 application. The chromatogram obtained is incorporated in the area corresponding to molecular weights higher than 65 g/mole.

Example 1

This example illustrates the use, in a method for manufacture of calcium carbonate by grinding followed by concentration, of a polymer according to the invention or according to the prior art in the course of the grinding step, where a given dispersing polymer is used during the step of concentration. It illustrates the influence of the polymers used during the grinding step on the stability of the suspensions obtained at the end of the method (measurement of certain Brookfield™ viscosities at different times), and also on the distribution of the particle sizes—slope factor $f=100*(d_{25}/d_{75})$—and on the light diffusion coefficient (S).

For each of the tests n° 1 to 10, the first step is to grind in water, according to the methods well known to the skilled man in the art (reference may be made to the grinding protocol as described in document WO 02/49765), a calcium carbonate which is a Carrara marble, of median diameter approximately equal to 10 μm.

The purpose of this first grinding step is to obtain a calcium carbonate dry weight content equal to 50% of the total weight of the suspension. It is undertaken in the presence of 0.45% by dry weight of a polymer according to tests n° 1 to 10, relative to the total dry weight of calcium carbonate.

In a second step, the suspension is concentrated (elimination of water with a thermal laboratory evaporator of make EPCON™)

The purpose of this second concentration step is to obtain a calcium carbonate dry weight content equal to 71% of the total weight of the suspension.

This step of concentration is accomplished in the presence of 0.25% by dry weight relative to the dry weight of calcium carbonate, of a blend (70/30 ratio by dry weight) of a homopolymer of acrylic acid, of molecular weight equal to 10,400 g/mole, 100% of the carboxylic sites of which in terms of moles are neutralised by sodium hydroxide, and of phosphoric acid.

Test n° 1

This test illustrates the prior art and uses a homopolymer of acrylic acid (according to document WO 02/49765) obtained by traditional radical polymerisation not followed by a separation, 50% of the carboxylic sites of which in terms of moles are neutralised by sodium, 15% by calcium and 15% by magnesium, of molecular weight equal to 9,600 g/mole, and 25% of the polymeric chains of which in terms of moles have a molecular weight less than 3,000 g/mole.

Test n° 2

This test illustrates the prior art and uses a homopolymer of acrylic acid obtained by traditional radical polymerisation not followed by a separation, totally neutralised by sodium hydroxide, of molecular weight equal to 3,100 g/mole, and 65% of the polymeric chains of which in terms of moles have a molecular weight less than 3,000 g/mole.

Test n° 3

This test illustrates the prior art and uses a homopolymer of acrylic acid obtained by traditional radical polymerisation followed by a separation, totally neutralised by sodium hydroxide, of molecular weight equal to 5,500 g/mole, and 37% of the polymeric chains of which in terms of moles have a molecular weight less than 3,000 g/mole.

Test n° 4

This test illustrates the prior art and uses a homopolymer of acrylic acid obtained by traditional radical polymerisation not followed by a separation, totally neutralised by sodium hydroxide, of molecular weight equal to 5,700 g/mole, and 40% of the polymeric chains of which in terms of moles have a molecular weight less than 3,000 g/mole.

Test n° 5

This test illustrates the prior art and uses a homopolymer of acrylic acid obtained by RAFT means, totally neutralised by sodium hydroxide, of molecular weight equal to 8,150 g/mole, and 24% of the polymeric chains of which in terms of moles have a molecular weight less than 3,000 g/mole.

Test n° 6

This test illustrates the prior art and uses a homopolymer of acrylic acid obtained by traditional radical polymerisation not followed by a separation, totally neutralised by sodium hydroxide, of molecular weight equal to 9,400 g/mole, and 27% of the polymeric chains of which in terms of moles have a molecular weight less than 3,000 g/mole.

Test n° 7

This test illustrates the prior art and uses a homopolymer of acrylic acid obtained by traditional radical polymerisation not followed by a separation, totally neutralised by sodium hydroxide, of molecular weight equal to 33,100 g/mole, and 17% of the polymeric chains of which in terms of moles have a molecular weight less than 3,000 g/mole.

Test n° 8

This test illustrates the prior art and uses a homopolymer of acrylic acid obtained by RAFT means, totally neutralised by sodium hydroxide, of molecular weight equal to 31,000 g/mole, and 12% of the polymeric chains of which in terms of moles have a molecular weight less than 3,000 g/mole.

Test n° 9

This test illustrates the invention and uses a homopolymer of acrylic acid obtained by traditional radical polymerisation followed by a separation, totally neutralised by sodium hydroxide, of molecular weight equal to 11,500 g/mole, and 17% of the polymeric chains of which in terms of moles have a molecular weight less than 3,000 g/mole.

Test n° 10

This test illustrates the invention and uses a homopolymer of acrylic acid obtained by RAFT means, totally neutralised by sodium hydroxide, of molecular weight equal to 10,800 g/mole, and 18% of the polymeric chains of which in terms of moles have a molecular weight less than 3,000 g/mole.

Test n° 11

This test illustrates the invention and uses a copolymer of acrylic acid/methacrylic acid (90/10 in terms of % by weight) obtained by traditional radical polymerisation followed by a separation, totally neutralised by sodium hydroxide, of molecular weight equal to 11,000 g/mole, and 16% of the polymeric chains of which have a molecular weight less than 3,000 g/mole.

Test n° 12

This test illustrates the invention and uses a copolymer of acrylic acid/methacrylic acid (90/10 in terms of % by weight) obtained by the RAFT method, totally neutralised by sodium hydroxide, of molecular weight equal to 9,000 g/mole, and 16% by mole of the polymeric chains of which have a molecular weight less than 3,000 g/mole.

In table 1, the characteristics of the polymers used during the grinding step are recalled. The values of the dry extracts after grinding step a) and concentration step b) (noted respectively $ES_a$ and $ES_b$) are also given, together with the percentages by weight of particles the diameters of which are less than 1 μm and 2 μm (noted respectively %<1 μm and %<2 μm).

TABLE 1

| | Test n° | | | | |
|---|---|---|---|---|---|
| | 1 | 2 | 3 | 4 | 5 |
| | Prior Art/Invention ("IN") | | | | |
| | PA | PA | PA | PA | PA |
| $M_w$ (g/mole) | 9,600 | 3,100 | 5,500 | 5,700 | 8,150 |
| % < 3,000 g/mole | 25 | 65 | 37 | 40 | 24 |
| $ES_a$ (%) | 49.6 | 51.7 | 49.8 | 50 | 50 |
| $ES_b$ (%) | 71.3 | 71.2 | 71.0 | 71.1 | 71.0 |
| % < 1 μm | 73.2 | 73.7 | 74.9 | 73.9 | 73.2 |
| % < 2 μm | 96.2 | 95.6 | 93.3 | 96.0 | 96.0 |

TABLE 1-continued

| | Test n° | | | | |
|---|---|---|---|---|---|
| | 6 | 7 | 8 | 9 | 10 |
| | \multicolumn{5}{c}{Prior Art/Invention ("IN")} |
| | PA | PA | PA | IN | IN |
| Mw (g/mole) | 9,400 | 33,100 | 31,000 | 11,500 | 10,800 |
| % < 3,000 g/mole | 27 | 17 | 12 | 17 | 18 |
| ESa (%) | 50 | — | — | 50.5 | 51.4 |
| Esb (%) | 71.4 | — | — | 71.0 | 71.0 |
| % < 1 µm | 73.7 | — | — | 73.4 | 73.2 |
| % < 2 µm | 95.8 | — | — | 96.3 | 96.1 |

| | Test n° | |
|---|---|---|
| | 11 | 12 |
| | \multicolumn{2}{c}{Prior Art/Invention ("IN")} |
| | IN | IN |
| Mw (g/mole) | 11,000 | 9,000 |
| % < 3,000 g/mole | 16 | 16 |
| ESa (%) | 51.0 | 51.1 |
| Esb (%) | 71.0 | 71.0 |
| % < 1 µm | 73.2 | 73.2 |
| % < 2 µm | 96.1 | 96.0 |

The measurements could not be made for tests n° 7 and 8, since grinding was not possible. These polymers, which have a molecular weight which is too high, do not enable calcium carbonate to be ground as far as achieving a dry extract close to 50%.

In a second step, for tests n° 1 to 6, and 9 to 12, the stabilities of the suspensions obtained were determined, by measuring their Brookfield™ viscosities at times t=0 and t=8 days (without prior stirring, at 25° C. and at 10 revolutions/minute), and noted respectively $\mu_0$ and $\mu_8$ (mPa·s). These results are shown in table 2.

TABLE 2

| | Test n° | | | | |
|---|---|---|---|---|---|
| | 1 | 2 | 3 | 4 | 5 |
| | \multicolumn{5}{c}{Prior Art/Invention ("IN")} |
| | PA | PA | PA | PA | PA |
| $M_w$ (g/mole) | 9,600 | 3,100 | 5,500 | 5,700 | 8,150 |
| % < 3,000 g/mole | 25 | 65 | 37 | 40 | 24 |
| $\mu_0$ (mPa·s) | 490 | 6,300 | 240 | 250 | 420 |
| $\mu_8$ (mPa·s) | 7,000 | 21,100 | 2,700 | 4,700 | 5,400 |

| | Test n° | | | | |
|---|---|---|---|---|---|
| | 6 | 9 | 10 | 11 | 12 |
| | \multicolumn{5}{c}{Prior Art/Invention ("IN")} |
| | PA | IN | IN | IN | IN |
| Mw (g/mole) | 9,400 | 11,500 | 10,800 | 11,000 | 9,000 |
| % < 3,000 g/mole | 27 | 17 | 18 | 16 | 16 |
| $\mu_0$ (mPa·s) | 300 | 560 | 350 | 550 | 650 |
| $\mu_8$ (mPa·s) | 9,300 | 2,400 | 3,100 | 3,200 | 3,200 |

It is observed that the viscosities obtained for tests n° 1, 2, 5 and 6 are greater than 5,000 mPa·s after 8 days; the corresponding aqueous suspension then proves to be difficult to handle and notably difficult to pump. Such tests are not satisfactory for the skilled man in the art.

In a final, third step, in the case of suspensions in which grinding was able to be accomplished, and for which the Brookfield™ viscosities (at 25° C. and at 10 revolutions/minute, 8 days before stirring) were less than 5,000 mPa·s, their slope factor f=100*($d_{25}/d_{75}$) was determined, together with their light diffusion coefficient S. These results are shown in table 3.

TABLE 3

| Test n° | 3 | 4 | 9 | 10 | 11 | 12 |
|---|---|---|---|---|---|---|
| Prior Art/Invention ("IN") | PA | PA | IN | IN | IN | IN |
| $M_w$ (g/mole) | 5,500 | 5,700 | 11,500 | 10,800 | 11,000 | 9,000 |
| % <3,000 g/mole | 37 | 40 | 17 | 18 | 16 | 16 |
| $d_{25}/d_{75}$ * 100 | 31.0 | 30.4 | 32.3 | 34.0 | 32.0 | 32.0 |
| S (m²/kg) | 136 | 138 | 141 | 144 | 140 | 140 |

Table 3 demonstrates clearly that only tests n° 9 to 12 corresponding to the invention lead to a notable improvement of the slope factor and thus of the opacity.

To summarise, only the homopolymers and the copolymers of acrylic acid obtained by RAFT means or by separation techniques, and which have the dual characteristic of having a molecular weight of between 8,000 g/mole and 15,000 g/mole, on the one hand, and of having a molar content of polymeric chains having a molecular weight of less than 3,000 g/mole of less than 20%, allow:
- calcium carbonate to be ground under the conditions of the example,
- with a view to obtaining suspensions the rheological properties of which after 8 days are in accordance with the requirements of the skilled man in the art,
- and the slope factor and light diffusion coefficient S of which have been improved.

The invention claimed is:

1. A method for manufacture of an aqueous suspension of natural calcium carbonate, the method comprising:
   a) grinding natural calcium carbonate in water in the presence of a homopolymer and/or a copolymer of (meth)acrylic acid, to give a mixture; and
   b) optionally, concentrating the mixture, wherein the homopolymer and/or copolymer of (meth)acrylic acid:
      has a molecular weight of between 8,000 g/mole and 15,000 g/mole; and
      has a molar polymeric chains content by molecular weight less than 3,000 g/mole of less than 20%; and
      is an activating opacity agent.

2. The method according to claim 1, wherein the homopolymer and/or copolymer of (meth)acrylic acid is obtained by radical polymerization in emulsion or in solution, followed by at least one static or dynamic separation with at least one polar solvent.

3. The method according to claim 1, wherein the homopolymer and/or copolymer of (meth)acrylic acid is obtained by controlled radical polymerization.

4. The method according to claim 3, wherein the polymerization is by reversible addition-fragmentation transfer (RAFT) and employs at least one chain transfer agent selected from the group consisting of:
   (a) a compound of formula (I):

$$R\text{—}X\text{—}C(S)\text{—}S\text{—}R' \qquad (I)$$

wherein:
   X is O or S,
   R is a group for stabilizing the function R—X by a covalent C—X bond,
   R' is a group wherein the R'—S bond is a C—S bond,
   (b) a hydrosoluble transfer agent; and
   (c) a compound of formula (II):

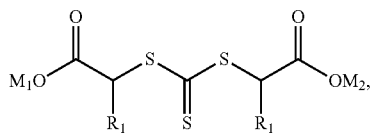

(II)

wherein:
- $R_1$ is an alkyl radical having 2 to 10 carbon atoms, or an aromatic radical optionally substituted by an alkyl chain having 1 to 4 carbon atoms; and
- $M_1$ and $M_2$ are identical or different and designate a hydrogen atom, an amine salt, ammonium, or an alkaline cation.

5. The method according to claim 1, wherein the homopolymer and/or copolymer of (meth)acrylic acid is totally acid, or totally or partially neutralized by at least one neutralization agent selected from the group consisting of sodium hydroxide, potassium hydroxide, calcium hydroxide, magnesium hydroxide, calcium oxide, magnesium oxide, and ammonium hydroxide.

6. The method according to claim 1, comprising grinding the natural calcium carbonate in water in the presence of said copolymer of (meth)acrylic acid wherein, in addition to the (meth)acrylic acid, the copolymer of (meth)acrylic acid comprises at least one further monomer selected from the group consisting of (meth)acrylic anhydride, (meth)acrylamide, a (meth)acrylic ester, a hydroxylate methacrylate, styrene, alpha-methylstyrene, styrene sulfonate, acrylamido-2-methyl-2-propane-sulphonic acid, an acrylate phosphate of ethylene glycol, and a methacrylate phosphate of ethylene glycol.

7. The method according to claim 1, wherein the homopolymer and/or copolymer of (meth)acrylic acid is present in an amount of 0.1 to 1.0%, by dry weight, relative to a dry weight of the calcium carbonate.

8. The method according to claim 1, said method comprising said concentrating step b) wherein, in addition to the said homopolymer and/or copolymer of (meth)acrylic acid, another homopolymer and/or copolymer of (meth)acrylic acid is present jointly during the concentrating step b).

9. The method according to claim 1, wherein a concentration by dry weight of calcium carbonate of a first aqueous suspension obtained on conclusion of the grinding a) is between 35% and 60% of a total weight of the first suspension.

10. The method according to claim 1, said method comprising said concentrating step b) wherein the concentration by dry weight of calcium carbonate of the aqueous suspension obtained on conclusion of the concentrating step b) is between 61% and 78%, of a total weight of the suspension.

11. The method according to claim 1, wherein the homopolymer and/or copolymer of (meth)acrylic acid has a molecular weight of between 8,000 g/mole and 12,000 g/mole.

12. The method according to claim 1, wherein the homopolymer and/or copolymer of (meth)acrylic acid has a molar polymeric chains content by molecular weight less than 3,000 g/mole of less than 15%.

13. The method according to claim 1, wherein the homopolymer and/or copolymer of (meth)acrylic acid has a molar polymeric chains content by molecular weight less than 3,000 g/mole of less than 10%.

14. The method according to claim 2, wherein the at least one polar solvent is selected from the group consisting of water, methanol, ethanol, propanol, isopropanol, a butanol, acetone, and tetrahydrofuran.

15. The method according to claim 3, wherein the controlled radical polymerization is a reversible addition-fragmentation transfer (RAFT) polymerization.

16. The method according to claim 1, wherein the homopolymer and/or copolymer of (meth)acrylic acid is totally or partially neutralized and the neutralization agent is at least one selected from the group consisting of sodium hydroxide, potassium hydroxide, and ammonium hydroxide.

17. The method according to claim 5, wherein the homopolymer and/or copolymer of (meth)acrylic acid is totally or partially neutralized and the neutralization agent is sodium hydroxide.

18. The method according to claim 6, wherein the at least one further monomer is a (meth)acrylic ester and is selected from the group consisting of methyl acrylate, ethyl acrylate, isopropyl acrylate, n-propyl acrylate, isobutyl acrylate, n-butyl acrylate, tert-butyl acrylate, 2-ethylhexyl acrylate, methyl methacrylate, and ethyl methacrylate.

19. The method according to claim 6, wherein the at least one further monomer is acrylamide.

20. The method according to claim 1, wherein the method provides an aqueous suspension of natural calcium carbonate having a slope factor $(d_{25}/d_{75}) \times 100$ of 32.0-34.0 and a light diffusion coefficient S of 140-144 $m^2/kg$.

* * * * *